Patented May 26, 1936

2,042,104

UNITED STATES PATENT OFFICE 2,042,104

RUBBER COATED CAKE OF SOAP

John P. Kane, New York, N. Y.

No Drawing. Application December 6, 1934,
Serial No. 756,281

9 Claims. (Cl. 91—68)

The present invention relates to a rubber coated cake of soap.

Heretofore it is well known that latex has been suggested for coating various articles. Generally speaking, the articles covered were of a relatively hard water insoluble nature which were unaffected by a watery vehicle such as is present in liquid latex. Attempts to use these prior processes on water soluble substances like soap demonstrated that certain shortcomings, defects and disadvantages were involved. Typical of the prior suggested processes is that disclosed in United States Reissue Patent No. 18,734. If an attempt were made to follow the teachings of these prior patents and to merely dip, spray, coat or otherwise cover a cake of soap with latex per se, it would be found that unsatisfactory and unsuccessful results would be produced. Thus, for instance, the latex may not adhere properly to the cake of soap. Furthermore, the liquid latex when dry would be sticky and would adhere to neighboring cakes of soap. In some instances, the latex or components thereof would bleed or run into the body of the soap and discolor the same. In addition, other disadvantages have been encountered in using the prior processes. Although many attempts have been made to overcome the defects and disadvantages of the prior processes, and to provide the article with a wholly satisfactory and successful procedure, none, as far as I am aware, have been wholly successful and satisfactory, particularly when carried into practice on an industrial and commercial scale.

I have discovered a rubber wrapped cake of soap which is free from the disadvantages and shortcomings noted hereinabove and which provides the art with a wholly satisfactory and successful article which can be produced on an industrial scale and which represents an article acceptable to a soap manufacturer and to the public.

It is an object of the invention to provide a cake of soap wrapped with a relatively thin membrane of rubber which faithfully conforms to the contour of the cake of soap and to all indentations thereon, including trade mark impressions, decorations, printing and other indicia.

It is a further object of the invention to provide a rubber coated cake of soap which makes an attractive package and a merchandisable article of manufacture which will not stick to neighboring cakes of soap and which will not take the impressions of a person's hand which handles the cake of soap.

It is also within the contemplation of the invention to provide a rubber coated cake of soap which is sanitary and which permits the perfume of the soap to be smelled freely through the rubber film which is permeable to the perfume.

A further object of the invention is to provide a rubber coated cake of soap with a little tab on a side of the cake so that a strip of rubber can be torn around the entire cake of soap when it is desired to unwrap the cake and to use it.

The invention also contemplates the provision of a procedure whereby cakes of soap can be coated on an industrial scale with daily mass production and at relatively low temperatures which will not affect the cake of soap.

Other objects and advantages of the invention will become apparent from the following description:

In carrying the present invention into practice, cakes of soap may be set on pins mounted on a conveyor. This conveyor can carry the mounted cakes of soap into a latex solution described in detail hereinafter. After covering or coating the cakes of soap, they can be carried through drying and vulcanizing chambers. If desired, the procedure can be repeated to apply two or more coats of rubber. In this manner, any desired thickness of rubber film can be built up.

An aqueous rubber solution which I have found to give a satisfactory coating is one containing about 100 parts by weight of rubber, about 2 to 3 parts by weight of sulfur, about 2 to 3 parts by weight of zinc oxide, and about 1 part by weight of ultra-rapid accelerator such as xanthate or the like. As those skilled in the art know, ultra-rapid accelerators include the class of dithio acids, dithiocarbamates, and xanthates; examples of which are potassium pentamethylene dithiocarbamate, with or without an addition of a potassium salt of mercaptobenzothiazole, piperidine-pentamethylene-dithiocarbamate, tetramethyl-thiuram disulfide, zinc-dimethyl dithiocarbamate, zinc-diethyl dithiocarbamate, lead-dimethyl dithiocarbamate, and sodium isopropyl xanthate. Usually, the solids in the rubber solution can be present to an extent of about 35 to about 40% by weight. In practice I have obtained satisfactory results with about 38% by weight of solids. Of course, concentrated rubber solutions can be used. Thus, I can use a concentrated rubber solution containing about 60% by weight of solids. In the event that it is desired to color the rubber, any appropriate coloring agent may be used. Generally speaking, I prefer to use a pigment color.

The aqueous rubber solution may be applied to the cake of soap by dipping, spraying, or coating or covering in any other manner. For industrial production, the conveyor system carrying the cakes of soap on pointed pins will give the most efficient results. Of course, frames in which the cakes of soap are suitably mounted may also be employed. The coating or dipping of the cake of soap in the rubber solution is conducted at low temperatures, say room temperatures or the like. After the cake has been coated with a rubber solution, it is passed through the drying and vulcanizing chamber where the film of rubber is completely dried and vulcanized at low temperatures, say below 100° C. At these low temperatures, the soap remains unaffected and is not deformed by the heat. By incorporating an ultra-rapid accelerator in the rubber compound, I can vulcanize the coating in a relatively short period of time and at relatively low temperatures. In this manner, an adherent rubber coating is formed over the cake of soap which snugly fits every indentation and contour so that the trade-marks and designs impressed in the soap appear very clearly and present an attractive package. The dry vulcanized rubber coating is not sticky to the hands and will not stick to adjacent cakes of soap. By providing a little tab of rubber on one side of the coating, the latter can be removed and stripped off the cake very easily.

In conducting the procedure of coating the cake of soap in the foregoing manner, I provide a rubber coating which does not stick to the cake of soap and which does not bleed or run into the cake of soap. Furthermore, the impressions, designs, printing etc., in the cake of soap are not destroyed or worn away by the watery vehicle forming the base of the rubber solution. The rubber coating may be stripped off the soap without sticking to the latter or pulling off pieces of soap. The finished article is water-proof and weather-proof so that the cake remains practically unaffected by atmospheric changes and by wetness from rain, etc. due to exposure in the open. The rubber coating may have any desired thickness but I have found that a coating having a thickness of about two to about five one thousandths of an inch gives satisfactory results.

I claim:—

1. The process of manufacturing a rubber coated cake of soap, which comprises coating a cake of soap with an aqueous rubber solution containing a vulcanizing agent and an ultra-rapid accelerator, and drying and vulcanizing said coated cake of soap at relatively low temperatures whereby a non-sticking, readily stripable coating impermeable to water and permeable to scents is obtained.

2. The process of manufacturing a rubber coated cake of soap, which comprises coating a cake of soap with an aqueous rubber solution containing a vulcanizing agent and an ultra-rapid accelerator, and drying and vulcanizing said coated cake of soap at temperatures lower than about 100° C. whereby a non-sticking, readily stripable coating impermeable to water and permeable to scents is obtained.

3. The process of manufacturing a rubber coated cake of soap, which comprises coating a cake of soap with an aqueous rubber solution containing about 100 parts by weight of rubber, about 2 to 3 parts by weight of sulfur, about 2 to 3 parts by weight of zinc oxide, and about 1 part by weight of an ultra-rapid accelerator, and subjecting said coated cake of soap to heat at relatively low temperatures to dry and vulcanize the rubber to form a membrane faithfully conforming to the indentations and contours of the cake of soap and being stripable therefrom without sticking to a person's hand or to parts of the cake of soap, said membrane being permeable to the scent of said soap and being impermeable to water.

4. The process of manufacturing a rubber coated cake of soap, which comprises coating a cake of soap with a 35 to 60% aqueous rubber solution containing about 100 parts by weight of rubber, about 2 to 3 parts by weight of sulfur, about 2 to 3 parts by weight of zinc oxide, and about 1 part by weight of an ultra-rapid accelerator, and subjecting said coated cake of soap to heat at relatively low temperatures to dry and vulcanize the rubber to form a membrane faithfully conforming to the indentations and contours of the cake of soap and being stripable therefrom without sticking to a person's hand or to parts of the cake of soap, said membrane being permeable to the scent of said soap and being impermeable to water.

5. The process of manufacturing a rubber coated cake of soap, which comprises coating a cake of soap with a 35 to 40% aqueous rubber solution containing about 100 parts by weight of rubber, about 2 to 3 parts by weight of sulfur, about 2 to 3 parts by weight of zinc oxide, and about 1 part by weight of an ultra-rapid accelerator, and subjecting said coated cake of soap to heat at relatively low temperatures to dry and vulcanize the rubber to form a membrane faithfully conforming to the indentations and contours of the cake of soap and being stripable therefrom without sticking to a person's hand or to parts of the cake of soap, said membrane being permeable to the scent of said soap and being impermeable to water.

6. The process of manufacturing a rubber coated cake of soap, which comprises coating a cake of soap with a 38% aqueous rubber solution containing about 100 parts by weight of rubber, about 2 to 3 parts by weight of sulfur, about 2 to 3 parts by weight of zinc oxide, and about 1 part by weight of an ultra-rapid accelerator, and subjecting said coated cake of soap to heat at relatively low temperatures to dry and vulcanize the rubber to form a membrane faithfully conforming to the indentations and contours of the cake of soap and being stripable therefrom without sticking to a person's hand or to parts of the cake of soap, said membrane being permeable to the scent of said soap and being impermeable to water.

7. As an article of manufacture, a cake of soap having impressions and indentations on its surface, a relatively thin, non-sticking envelope of a dried aqueous solution of rubber completely encasing said cake of soap and exactly conforming to said impressions and indentations and to the contours of said soap, said envelope being permeable to the scent of said soap and being impermeable to water and capable of being readily stripped from said cake of soap.

8. As an article of manufacture, a cake of soap coated with a thin, non-sticking and readily stripable layer of a dried aqueous solution constituted of rubber, a vulcanizing agent and an ultra rapid accelerator said layer exactly conforming to the indentations and contours of the cake of soap, being permeable to a scent contained in said soap and being impermeable to water.

9. As an article of manufacture, a cake of soap coated with a thin, non-sticking membrane of a dried aqueous solution constituted of rubber, sulfur, zinc oxide, and an ultra rapid accelerator, said membrane exactly conforming to the indentations and contours of the cake of soap, being permeable to the scent of said soap and impermeable to moisture, and a tab associated with said membrane to facilitate tearing off the membrane and stripping thereof from the cake of soap.

JOHN P. KANE.